United States Patent
Natsume et al.

(10) Patent No.: US 10,814,745 B2
(45) Date of Patent: Oct. 27, 2020

(54) LOWER VEHICLE BODY STRUCTURE

(71) Applicant: Mazda Motor Corporation, Aki-gun, Hiroshima (JP)

(72) Inventors: Hirotaka Natsume, Hiroshima (JP); Hidenori Matsuoka, Hiroshima (JP); Keisuke Ebisumoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 6 days.

(21) Appl. No.: 16/246,706

(22) Filed: Jan. 14, 2019

(65) Prior Publication Data

US 2019/0217742 A1 Jul. 18, 2019

(30) Foreign Application Priority Data

Jan. 16, 2018 (JP) ................... 2018-004632

(51) Int. Cl.
| | | |
|---|---|---|
| *B60N 2/00* | (2006.01) | |
| *B60N 2/005* | (2006.01) | |
| *B62D 39/00* | (2006.01) | |
| *B60K 17/08* | (2006.01) | |
| *B60K 17/04* | (2006.01) | |
| *B62D 25/20* | (2006.01) | |

(52) U.S. Cl.
CPC ............ *B60N 2/005* (2013.01); *B60K 17/04* (2013.01); *B60K 17/08* (2013.01); *B62D 25/20* (2013.01); *B62D 39/00* (2013.01); *B62D 25/2036* (2013.01); *B62D 25/2045* (2013.01)

(58) Field of Classification Search
CPC .... B60N 2002/363; B60N 2/36; B60N 2/015; B60N 2/6009; B60N 2/005; B60N 2/012; B60N 2/206; B60N 2/60

USPC ...... 296/193.07, 187.08, 204, 29, 75, 97.23; 428/99, 85, 116, 61, 158, 457, 172
See application file for complete search history.

(56) References Cited

U.S. PATENT DOCUMENTS

| | | | | |
|---|---|---|---|---|
| 7,810,875 | B2 * | 10/2010 | Gerisch | B21D 53/88 296/193.07 |
| 8,608,237 | B2 * | 12/2013 | Hwang | B60R 13/0876 296/193.07 |
| 10,124,834 | B2 * | 11/2018 | Saeki | B62D 25/2036 |
| 2004/0069562 | A1 * | 4/2004 | Kondo | B60K 15/06 181/227 |
| 2007/0007797 | A1 * | 1/2007 | Seki | B60H 1/3233 296/208 |

(Continued)

FOREIGN PATENT DOCUMENTS

JP 2013154731 A 8/2013

*Primary Examiner* — D Glenn Dayoan
*Assistant Examiner* — Sunsurraye Westbrook
(74) *Attorney, Agent, or Firm* — Alleman Hall Creasman & Tuttle LLP

(57) ABSTRACT

A lower vehicle body structure is provided, which includes a vehicle body floor having a bottom surface part, a floor tunnel bulging upwardly from the bottom surface part of the vehicle body floor and extending in vehicle front-and-rear directions, a power transmission mechanism disposed inside the floor tunnel, a mount member supporting the power transmission mechanism from below, and seat rails disposed on the vehicle body floor and slidably supporting seats from below. The mount member and the seat rails are jointly fastened to the vehicle body floor.

10 Claims, 7 Drawing Sheets

(56) References Cited

U.S. PATENT DOCUMENTS

| | | | | |
|---|---|---|---|---|
| 2010/0187864 A1* | 7/2010 | Tsuchida | ................ | B62D 25/20 |
| | | | | 296/193.07 |
| 2014/0203595 A1* | 7/2014 | Mochizuki | ............. | B62D 25/20 |
| | | | | 296/193.07 |
| 2016/0101687 A1* | 4/2016 | Basista | ................ | B60K 15/067 |
| | | | | 296/193.07 |

* cited by examiner

LOWER VEHICLE BODY STRUCTURE

TECHNICAL FIELD

The present disclosure relates to a lower vehicle body structure provided with a mount member which supports a power transmission mechanism inside a floor tunnel, and a seat rail disposed on a vehicle body floor, and belongs to a production engineering field of vehicle bodies.

BACKGROUND OF THE DISCLOSURE

Vehicles, such as FR (front engine rear drive) and 4WD (four-wheel drive) vehicles, may be provided with a propeller shaft extending in vehicle front-and-rear directions in a power transmission path from a driving source to driving wheels. The propeller shaft is typically disposed inside a floor tunnel formed in a center part of a vehicle body floor in the vehicle width directions. For example, in vehicles on which a so-called longitudinal power train is mounted, at least a part of a transmission may be disposed inside the floor tunnel.

Floor cross members extending in vehicle width directions may also be provided on an upper surface of the vehicle body floor in order to improve the rigidity of the vehicle body. In such a vehicle body having the floor tunnel, the floor cross members are dividedly disposed on the left and right, having the floor tunnel therebetween.

JP2013-154731A discloses power transmission mechanisms, such as the propeller shaft and the transmission, disposed inside the floor tunnel may be supported by a mount member disposed therebelow.

In this vehicle body structure, both end parts of the mount member in the vehicle width directions are fixed to a lower surface of the floor tunnel via a reinforcement member (tunnel cross member) disposed in the floor tunnel so as to bridge over the propeller shaft from above. In this vehicle body structure, the left and right floor cross members divided by the floor tunnel are coupled to each other via the mount member and the reinforcement member, thereby improving the rigidity of the vehicle body more effectively.

Meanwhile, seat rails extending in the vehicle front-and-rear directions are typically provided on the vehicle body floor to guide the slide movement of seats. The seat rails are typically fixed to the vehicle body via highly-rigid brackets. Thus, heavy seats can be supported stably.

Depending on the layout of the vehicle, fixed locations of the seat rails to the vehicle body (specifically, fixed locations of the brackets for fixing the seat rails) and fixed locations of the mount member to the vehicle body may be too close to each other. In this case, vibration of the power transmission mechanism is easily transmitted to seats via the mount member, the vehicle body, and the seat rails.

A conventional measure for reducing such transmission of vibration to the seats from the power transmission mechanism is to utilize the brackets for fixing the seat rails having higher rigidity.

However, the vibration reducing effect tends to be limited only by increasing the rigidity of the brackets. Therefore, vibration sensed by seated persons on board may not be reduced effectively. In addition, the weight increases due to the highly rigid brackets.

SUMMARY OF THE DISCLOSURE

Therefore, one purpose of the present disclosure is to provide a vehicle, more particularly a lower vehicle body structure, in which a power transmission mechanism inside a floor tunnel is supported by a mount member, and seat rails are provided on a vehicle body floor, and to effectively reduce transmission of vibration to seats from the power transmission mechanism while reducing the weight of a vehicle body.

According to one aspect of the present disclosure, a lower vehicle body structure is provided, which includes a vehicle body floor having a bottom surface part, a floor tunnel bulging upwardly from the bottom surface part of the vehicle body floor and extending in vehicle front-and-rear directions, a power transmission mechanism disposed inside the floor tunnel, a mount member supporting the power transmission mechanism from below, and seat rails disposed on the vehicle body floor and slidably supporting seats from below. The mount member and the seat rails are jointly fastened to the vehicle body floor.

According to this configuration, since the mount member and the seat rails are integrated by being jointly fastened to the vehicle body floor, vibration sensed by a seated person can be reduced based on the following described principle. As shown in Equation 1, the expression between an external force F(t) as a function of time and a displacement x is known as an equation of motion regarding the vibration.

$$m\ddot{x}+c\dot{x}+kx=F(t) \qquad (1)$$

m: mass
c: extinction coefficient
k: spring constant

According to this configuration, regarding the vibration transmitted to the vehicle body via the mount member from the transmission, the vehicle body vibration system can include the seat rails, seats, and a seated person. Therefore, in Equation 1, the mass m of the vehicle body vibration system is increased effectively by including part of the weight of the seat and part of the weight of the seated person. Accordingly, the displacement x, i.e., the vibration transmitted to the vehicle body via the mount member from the transmission, can be reduced effectively. As a result, the vibration transmitted to the seat via the vehicle body and the seat rail, i.e., the vibration sensed by the seated person, can be reduced effectively.

Moreover, since the vibration reduction is achieved by the increase of the mass m in the equation of motion of Equation 1, it is unnecessary to consider the conventional measure in which, for example, the spring constant k is increased by increasing the rigidity of brackets for fixing the seat rails. Thus, the brackets for fixing the seat rails can be reduced in size or eliminated entirely, thereby reducing the weight of the vehicle body and/or simplifying the vehicle body structure.

Floor cross members extending outwardly from the floor tunnel in vehicle width directions may be disposed on the bottom surface part. The mount member and each of the seat rails may be jointly fastened to a respective floor cross member.

According to this configuration, since the mount member and the seat rails are jointly fastened to the floor cross members, load distributions from the mount member to the floor cross members and from the seat rails to the floor cross members are effectively achieved. Further, in a case of providing the floor cross members on both sides of the floor tunnel, it is easy to achieve the effective load transmission via the mount member between the floor cross members.

The mount member may be disposed below the vehicle body floor. Each of the seat rails may be disposed on a respective intermediate member that is disposed above the vehicle body floor with a gap. The mount member and each of the seat rails may be jointly fastened via a respective spacer member intervening between the vehicle body floor and the respective intermediate member.

According to this configuration, since the mount member and each seat rail are jointly fastened via the spacer member which intervenes between the vehicle body floor and the intermediate member thereabove, the relative displacement between a fixed location of the mount member with respect to a lower surface of the vehicle body floor and a fixed location of the seat rails with respect to an upper surface of the intermediate members can be reduced effectively. Therefore, even though the mount member and the seat rails are separated from each other in the vehicle up-and-down directions, a reduction of the spring constant k of the vibration system between the mount member and the seat rails is prevented in the equation of motion of Equation 1, thereby appropriately achieving the vibration reduction described above.

Each spacer member may be a high nut with which a respective bolt used for jointly fastening the mount member and the respective seat rail is threadedly engaged.

According to this configuration, since the high nut used as each spacer member between the vehicle body floor and the intermediate member thereabove is mechanically coupled to the vehicle body floor and the intermediate member, the relative displacement between the mount member and the seat rails is reduced effectively.

Each intermediate member may be a floor cross member forming with the vehicle body floor a respective closed cross-section continuing in the vehicle width directions, and each spacer member may be disposed within the respective closed cross-section.

According to this configuration, since the mount member and the seat rails are jointly fastened via the spacers disposed inside the closed cross-sections between the vehicle body floor and the floor cross members, the relative displacement between the mount member and the seat rails is reduced effectively.

DETAILED DESCRIPTION OF THE DISCLOSURE

Figure 1:
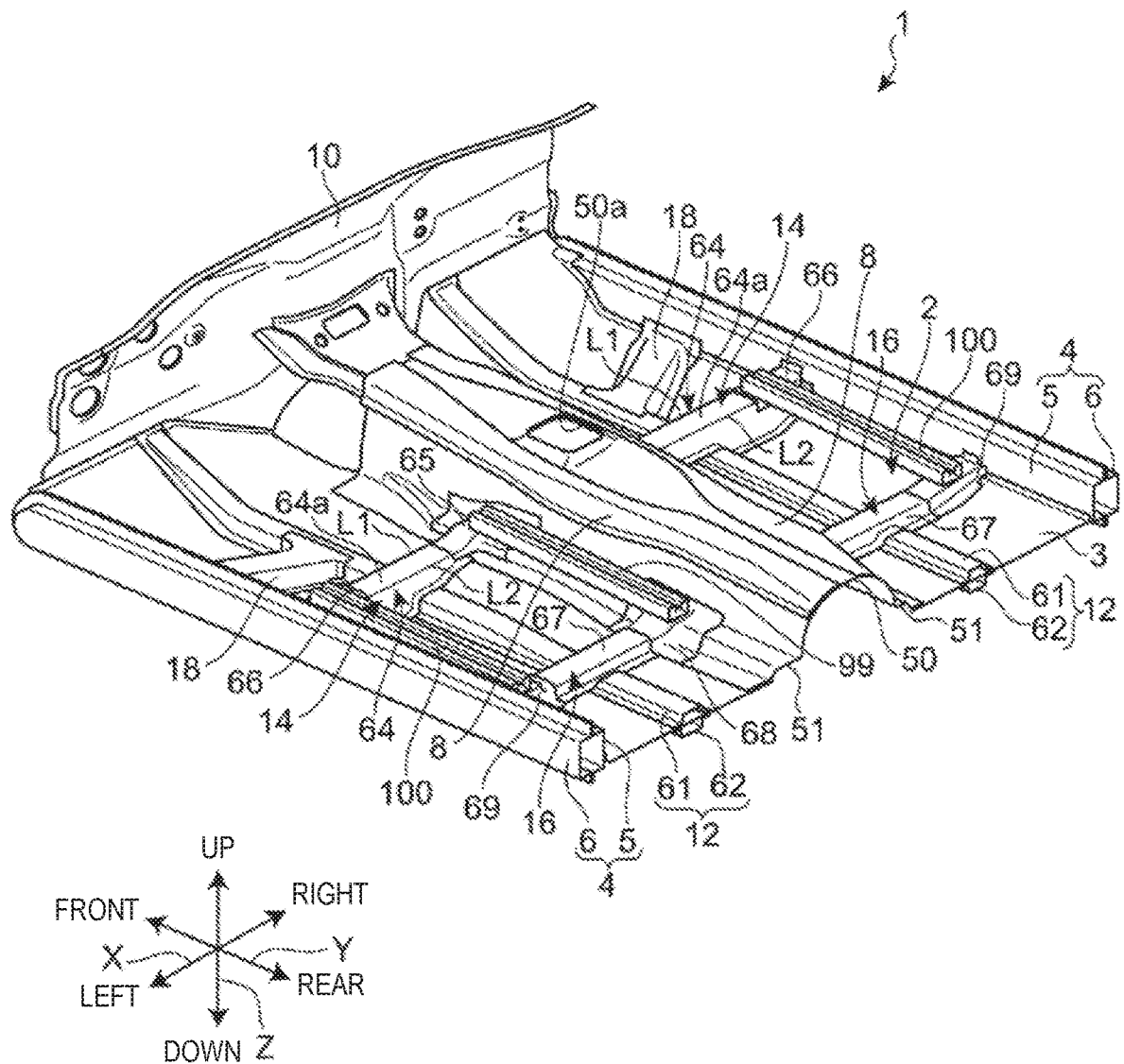
FIG. 1 is a perspective view illustrating a lower vehicle body structure according to one embodiment of the present disclosure.

Hereinafter, a lower vehicle body structure according to one embodiment of the present disclosure is described with reference to the accompanying drawings. Note that in the following description, directional terms, such as "front," "rear," "right," "left," "up," and "down," indicate each direction of a vehicle body when the heading of the vehicle traveling is to the "front," unless otherwise particularly described. In addition, in the accompanying drawings, a reference character "X" is given to vehicle width directions, a reference character "Y" to vehicle front-and-rear directions, and a reference character "Z" to vehicle up-and-down directions.

[Entire Structure]

Figure 2:
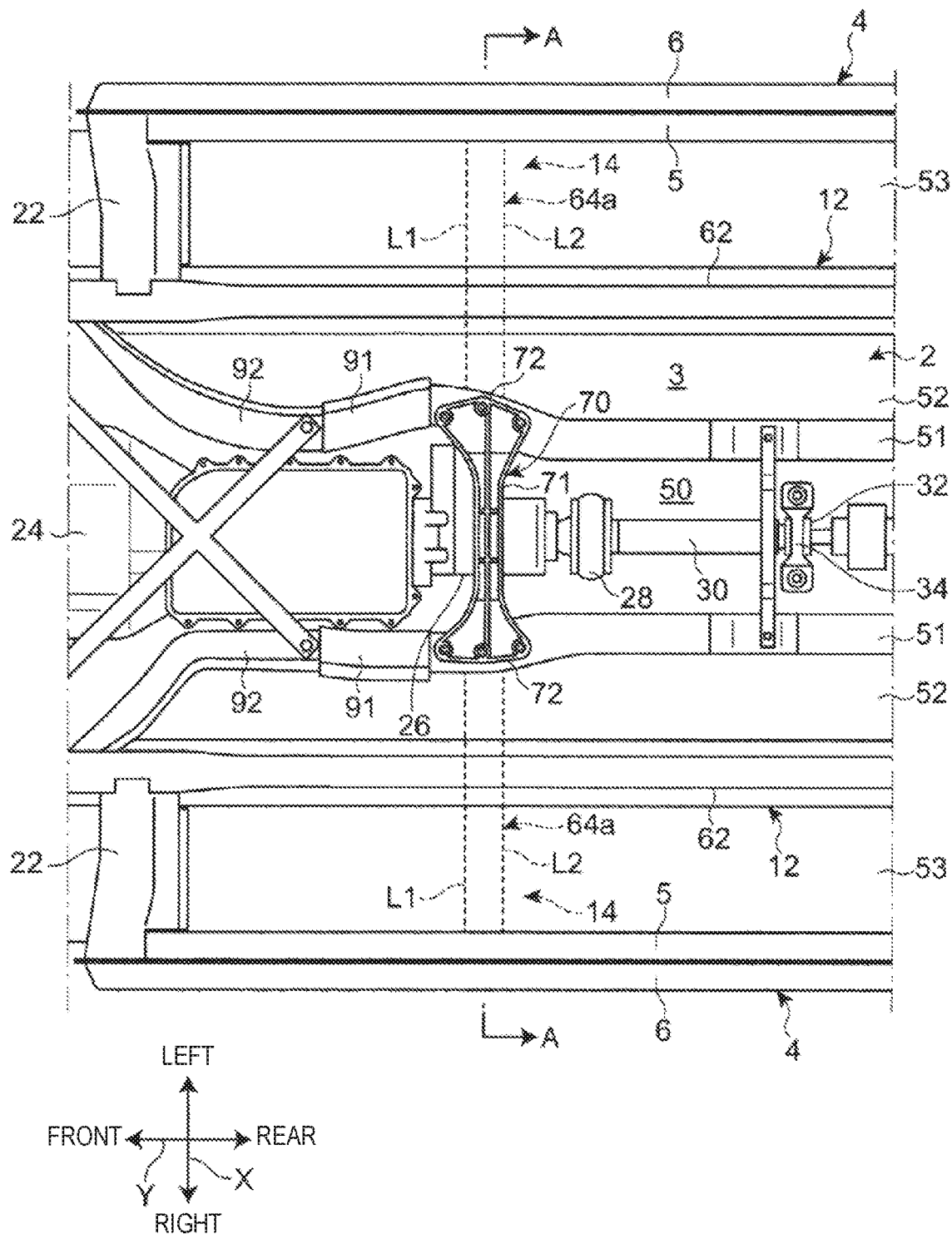
FIG. 2 is a bottom view illustrating the lower vehicle body structure.

As illustrated in a perspective view of FIG. 1 and a bottom view of FIG. 2, a vehicle 1 provided with the lower vehicle body structure according to this embodiment includes a vehicle body floor 2 which constitutes a floor surface of an interior space of a cabin, a pair of side sills 4 extending in the vehicle front-and-rear directions Y along both sides of the vehicle body floor 2 in the vehicle width directions X, and a dash board 10 disposed in front of the vehicle body floor 2.

Each side sill 4 includes a side sill inner part 5 of a hat shape in cross section, which opens outwardly in the vehicle width directions X, and a side sill outer part 6 of a hat shape in cross section, which opens inwardly in the vehicle width directions X. The side sill inner part 5 and the side sill outer part 6 are joined to each other to form a closed cross-section which continues in the vehicle front-and-rear directions Y.

The vehicle 1 is further provided with a pair of hinge pillars (not illustrated) which rise from respective front end parts of the left and right side sills 4 and extend in the vehicle up-and-down directions Z, and the dash board 10 is bridged between the pair of hinge pillars. The dash board 10 partitions the vehicle interior space and an engine bay in the vehicle front-and-rear directions Y.

The vehicle body floor 2 includes a bottom surface part 3, and a floor tunnel 50 formed so as to bulge upwardly from the bottom surface part 3. The floor tunnel 50 is formed so as to extend in the vehicle front-and-rear directions Y in a center part of the vehicle body floor 2 in the vehicle width directions X. The cross-sectional shape of the floor tunnel 50 is a U-shape which opens downwardly, when seen in the vehicle front-and-rear directions Y.

An opening 50a through which a shift lever (not illustrated) passes is formed in an upper surface part of the floor tunnel 50. Reinforcement members 8 extending in the vehicle front-and-rear directions Y are joined to both side parts of the upper surface part of the floor tunnel 50 in the vehicle width directions X, for example, by welding, thereby increasing the rigidity of the floor tunnel 50.

A pair of left and right floor frames 12 extending in the vehicle front-and-rear directions Y are joined to the bottom surface part 3 of the vehicle body floor 2. Each floor frame 12 is disposed between the floor tunnel 50 and the corresponding side sill 4 in the vehicle width directions X. As illustrated in FIG. 2, each floor frame 12 is coupled to a front end part of the side sill 4 via a torque box 22 which extends in the vehicle width directions X.

As illustrated in FIG. 1, each floor frame 12 includes an upper frame member 61 joined to the upper surface of the vehicle body floor 2, for example, by welding, and a lower frame member 62 joined to the lower surface of the vehicle body floor 2, for example, by welding. Each upper frame member 61 and lower frame member 62 is disposed so as to oppose each other, having the vehicle body floor 2 therebetween. The upper frame members 61 and the lower frame members 62 are disposed so as to extend in the vehicle front-and-rear directions Y, and together form a closed cross-section which continues in the vehicle front-and-rear directions Y.

A pair of left and right first cross members 14 and a pair of left and right second cross members 16 are joined to the upper surface of the bottom surface part 3 of the vehicle body floor 2, as floor cross members extending in the vehicle width directions X. Each first cross member 14 and each second cross member 16 are bridged between the floor tunnel 50 and one of the side sills 4.

The left and right first cross members 14 overlap with the opening 50a of the floor tunnel 50 and are disposed substantially at the same position in the vehicle front-and-rear directions Y. The left and right second cross members 16 are also disposed substantially at the same position in the vehicle front-and-rear directions Y, rearward of the first cross members 14.

Each first cross member 14 includes a cross member body 64 extending in the vehicle width directions, and first and second seat brackets 65 and 66 which support a pair of seat rails 99 and 100 (see FIG. 3) of a seat sliding mechanism, respectively. The cross member bodies 64 and the first and second seat brackets 65 and 66 are, for example, pressed parts made of steel.

The cross member bodies 64 have a hat-like cross-sectional shape which opens downwardly, and form with the vehicle body floor 2 a closed cross-section which continues in the vehicle width directions X. Each cross member body 64 has an upper surface part 64a which is disposed above and opposes to the bottom surface part 3 of the vehicle body floor 2. Each upper surface part 64a is disposed so as to extend in the vehicle width directions X. A front ridgeline L1 which extends in the vehicle width directions X is formed in a front edge part of each upper surface part 64a, and a rear ridgeline L2 which extends in the vehicle width directions X is formed in a rear edge part of each upper surface part 64a.

An inner end part of each cross member body 64 in the vehicle width directions X is disposed outward of the floor tunnel 50 in the vehicle width directions X. A first seat bracket 65 is joined to the inner end part of each cross member body 64 in the vehicle width directions X, and each cross member body 64 is coupled to the floor tunnel 50 via the first seat bracket 65.

An outer end part of each cross member body 64 in the vehicle width directions X is joined to the side sill inner part 5 of the respective side sill 4. Each second seat bracket 66 is joined to an outer end part of the respective cross member body 64 in the vehicle width directions X, and the side sill inner part 5.

Each second cross member 16 is also comprised of a cross member body 67 and a pair of seat brackets 68 and 69, similar to the first cross members 14.

A pair of left and right slanting frames 18 are joined to the upper surface of the bottom surface part 3 of the vehicle body floor 2, for example, by welding. Each slanting frame 18 is disposed so as to extend obliquely rearward and extend inwardly in the vehicle width directions X, at a position forward of the first cross member 14. The slanting frames 18 are provided so as to couple the floor frame 12 to the side sills 4. The slanting frames 18 have a hat-like cross-sectional shape which opens downwardly, and forms with the vehicle body floor 2 a closed cross-section which continues in the longitudinal directions of the slanting frames 18.

Figure 3:
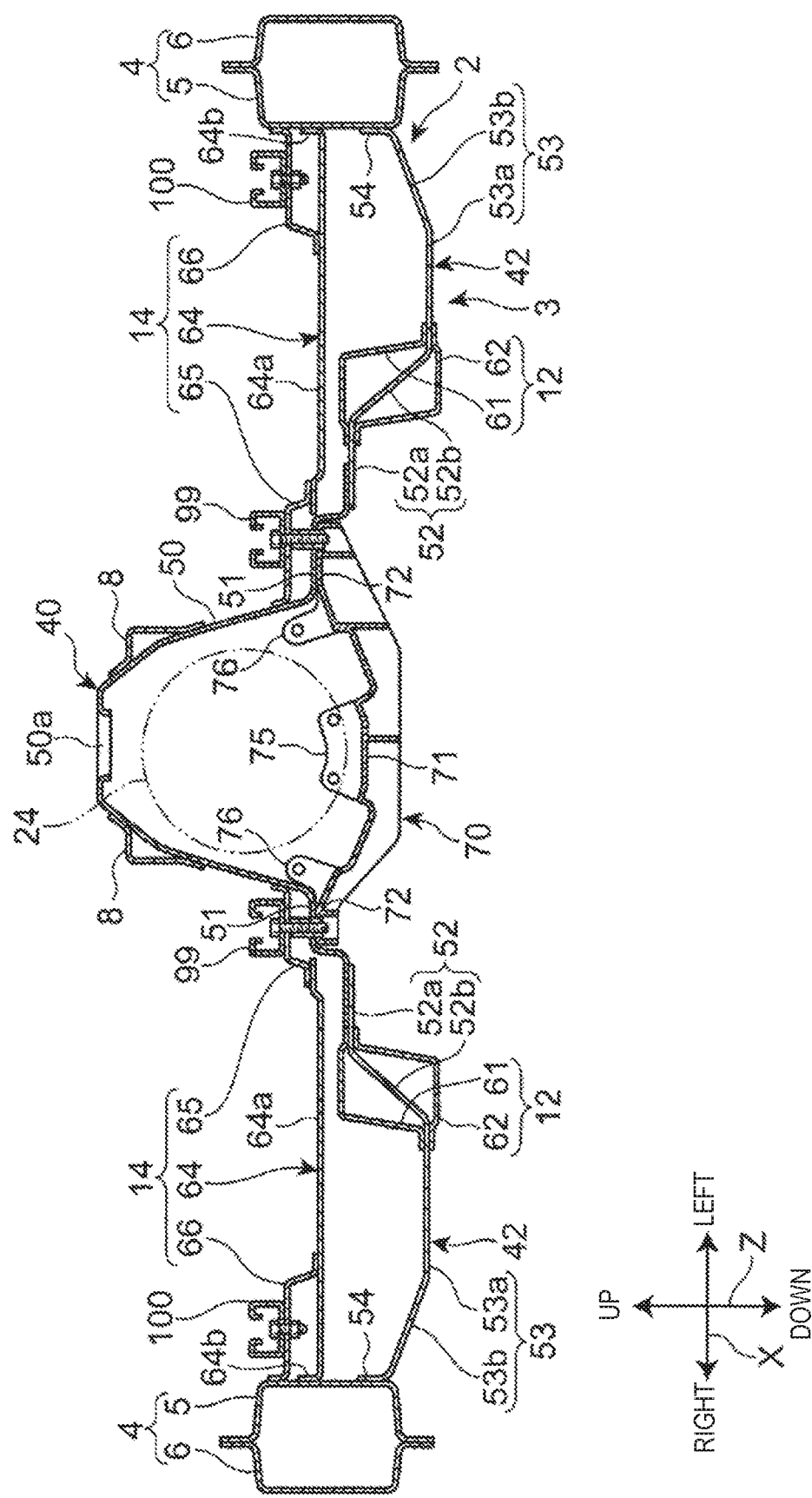
FIG. 3 is a cross-sectional view taken along a line A-A in FIG. 2, viewed from the front of a vehicle, illustrating the lower vehicle body structure at a fixed location of a mount member and seat rails.

As illustrated in FIG. 3 which is a cross-sectional view taken along a line A-A in FIG. 2, two seat rails 99 and 100 are provided at the right side and the left side of the floor tunnel 50 (for a total of four seat rails). Each of left and right front seats (not illustrated) is slidably supported by the two seat rails 99 and 100 from below. The two seat rails 99 and 100 are separated from each other in the vehicle width directions X, and extend in the vehicle front-and-rear directions Y. Each of the seat rails 99 and 100 is, for example, a pressed part made of steel, and has a substantially channel cross-sectional shape which opens upwardly.

The seat rails 99 located inward in the vehicle width directions X are fixed to the first seat bracket 65 of the first cross members 14 at a front end part thereof, and are fixed to the seat bracket 68 (see FIG. 1) of the second cross members 16 at the rear end part thereof. The seat rails 100 located outward in the vehicle width directions X are fixed to the second seat bracket 66 of the first cross members 14 at a front end thereof, and are fixed to the seat bracket 69 (see FIG. 1) of the second cross members 16 at a rear end part thereof.

The vehicle 1 of the embodiment is, for example, a FR (front engine rear drive) vehicle provided with a longitudinal power train. The power train of the vehicle 1 includes an engine (not illustrated) as a driving source mounted inside an engine room in front of the dash board 10 (see FIG. 1), and a transmission 24 (see FIG. 2) coupled to a rear part of the engine.

As illustrated in FIG. 2, the transmission 24 is, for example, a longitudinal automatic transmission, and has an output shaft (not illustrated) extending in the vehicle front-and-rear directions Y. The transmission 24 may be a manual type. A rear end part of the output shaft of the transmission 24 is coupled to a propeller shaft 30 extending in the vehicle front-and-rear directions Y, via a universal joint 28. Thus, the engine output can be transmitted to rear wheels via the transmission 24, the propeller shaft 30, etc.

The propeller shaft 30 is disposed inside the floor tunnel 50. The propeller shaft 30 is supported by a lower surface of the floor tunnel 50 via a bearing 32 and a support member 34.

At least a rear end part of the transmission 24 is disposed inside the floor tunnel 50. A supported part 26 which is supported by a mount member 70 from below the floor tunnel 50 is provided to a rear part of the transmission 24. The supported part 26 is provided to the rear end part of the transmission 24.

The mount member 70 is fixed to the vehicle body floor 2 at a position in the vehicle front-and-rear directions Y where it overlaps with the upper surface part 64a of the first cross members 14. Thus, the rear part of the transmission 24 is supported by the vehicle body via the mount member 70. A front part of the transmission 24 is supported by the vehicle body (e.g., a front suspension member) via the engine and engine mounts (not illustrated). The structure of the mount member 70 and a fixing structure of the mount member 70 will be described later.

[Peripheral Structure of Mount Member]

The structure of the vehicle body floor 2 and its peripheral part at a position in the vehicle front-and-rear directions Y where the mount member 70 and the first cross members 14 are disposed is described with reference to the cross-sectional view of FIG. 3 and the enlarged cross-sectional view of FIG. 4.

As illustrated in FIG. 3, the vehicle body floor 2 is comprised of a tunnel panel 40 which constitutes the floor tunnel 50, and a pair of left and right bottom surface panels 42 which constitute the bottom surface part 3. The tunnel panel 40 is disposed in a center part of an area in the vehicle width directions X between the left and right side sills 4.

Each bottom surface panel 42 is formed so as to couple the tunnel panel 40 to the corresponding side sill 4.

The tunnel panel 40 and the bottom surface panels 42 are, for example, pressed parts made of steel. The tunnel panel 40 may desirably have the rigidity and strength higher than those of the bottom surface panel 42, thereby increasing the rigidity and strength of the floor tunnel 50.

The vehicle body floor 2 is further provided with a pair of upper parts 51, which are raised inwardly in the vehicle width directions X from the bottom surface part 3, between the bottom surface parts 3 and the floor tunnel 50, and which continues to a lower edge part of the floor tunnel 50. Each upper part 51 extends in the vehicle front-and-rear directions Y along the lower edge part of the floor tunnel 50, from a position forward of the first cross members 14 to a position rearward of the second cross members 16 (see FIG. 1).

Thus, since the upper parts 51 integrated with the vehicle body floor 2 are provided in the boundary part between the bottom surface parts 3 and the lower edge parts of the floor tunnel 50, the rigidity is increased. Therefore, in the area in the vehicle front-and-rear directions Y where the upper parts 51 are provided, the reinforcement is achieved along the lower edge parts of the floor tunnel 50, without providing a separate reinforcement member from the vehicle body floor 2.

As illustrated in FIG. 2, in a front end part of the vehicle body floor 2, reinforcement members 91 and 92 extending in the vehicle front-and-rear directions Y are provided along the boundary part between the bottom surface part 3 and the lower edge parts of the floor tunnel 50. The reinforcement members 91 and 92 are provided in the part ranging from a position where the members overlap with a front end part of the raised parts 51 to a position forward of the upper parts 51 in the vehicle front-and-rear directions Y. Thus, the reinforcement members 91 and 92 reinforce the part where the upper parts 51 are not provided.

Figure 4:
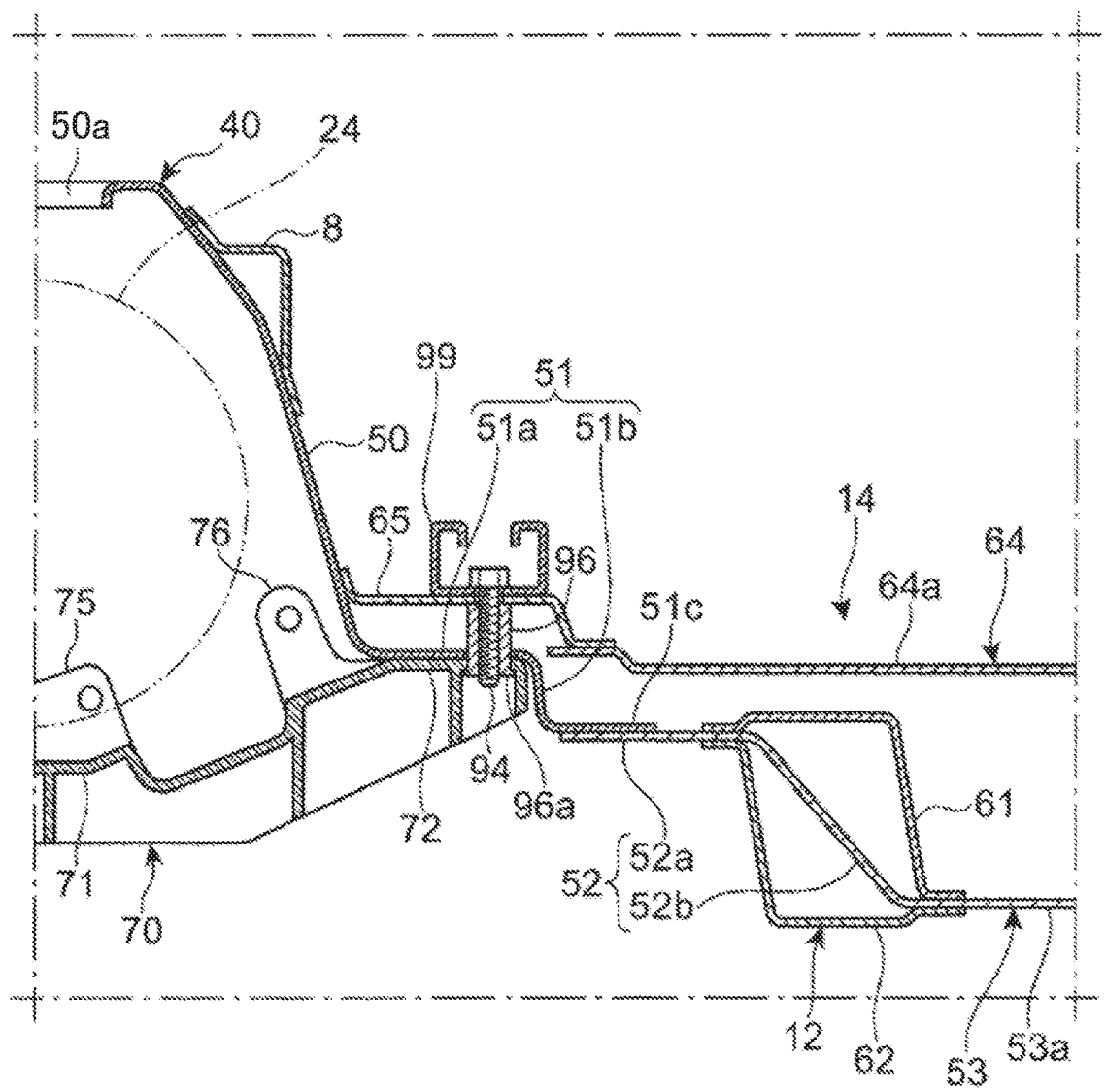
FIG. 4 is a partial enlarged cross-sectional view of FIG. 3 of fixed locations of the mount member and seat rails and a peripheral part.

As illustrated in FIG. 4, each upper part 51 includes a lateral plate part 51a extending outwardly in the vehicle width directions X from a lower end part of the floor tunnel 50, and a vertical plate part 51b extending downwardly in the vehicle up-and-down directions Z from an outer end part of the lateral plate part 51a. The vertical plate part 51b may incline downwardly, and outwardly in the vehicle width directions X.

In this embodiment, the lateral plate part 51a and the vertical plate part 51b of each upper part 51 are comprised of a part of the tunnel panel 40. The tunnel panel 40 is further provided with an extended part 51c extending outwardly in the vehicle width directions X from a lower end part of the vertical plate part 51b. The extended part 51c is joined to the bottom surface panel 42, for example, by welding.

Each upper part 51 may be comprised of a part of the bottom surface panel 42, or may be comprised of a separate floor structural member from the tunnel panel 40 and the bottom surface panel 42.

As illustrated in FIG. 3, the bottom surface part 3 of the vehicle body floor 2 includes a pair of left and right middle parts 52 which continues to the outsides of the upper parts 51 in the vehicle width directions X, a pair of left and right lower parts 53 which continues to the outsides of the middle parts 52 in the vehicle width directions X, and a pair of left and right joined parts 54 joined to the side sills 4 outside the lower parts 53 in the vehicle width directions X.

As illustrated in FIG. 4, each middle part 52 includes a lateral plate part 52a extending in the vehicle width directions X, and a first inclined part 52b extending downwardly from an outer end part of the lateral plate part 52a and extending in a direction inclined outwardly in the vehicle width directions X. The lateral plate part 52a of the middle part 52 is joined to a lower surface of the extended part 51c of the tunnel panel 40. Thus, the inner end part of the lateral plate part 52a of the middle part 52 in the vehicle width directions X is coupled to a lower end part of the vertical plate part 51b of the upper part 51 via the extended part 51c. The upper frame member 61 and the lower frame member 62 which constitute the floor frame 12 oppose each other, having the first inclined part 52b of the middle part 52 therebetween.

As illustrated in FIG. 3, each lower part 53 includes a lateral plate part 53a extending outwardly in the vehicle width directions X from a lower end part of the first inclined part 52b of the middle part 52, and a second inclined part 53b extending outwardly in the vehicle width directions X from an outer end part of the lateral plate part 53a and inclines upwardly. The lateral plate parts 53a of the lower parts 53 constitute the lowermost part of the vehicle body floor 2.

Each joined part 54 extends upwardly from an outer end part of the second inclined part 53b of each lower part 53. The joined part 54 is joined to a side surface of the side sill inner part 5 of the side sill 4, which faces inwardly and toward the cabin, for example, by welding.

Thus, each lower part 53 is disposed below the joined part 54 joined to the respective side sill 4 in the vehicle up-and-down directions Z. Thus, in the area in the vehicle width directions X where the lower part 53 is provided, since the cross-sectional area of the closed cross-section formed between the vehicle body floor 2 and the first cross members 14 is expanded, the rigidity of the first cross members 14 is improved.

Note that the cross-sectional shape of the vehicle body floor 2 at the line A-A in FIG. 2 is not limited to the shape illustrated in FIGS. 3 and 4, but may suitably be other shapes. For example, the middle part 52 which intervenes between the upper part 51 and the lower part 53 may be formed in a plurality of stages or may be omitted. Moreover, in this embodiment, although the lateral plate part 53a of each lower part 53 is disposed below the joined parts 54, it may be disposed at a height where it overlaps with the joined parts 54 or at a position above the joined parts 54.

As illustrated in FIG. 3, the upper surface part 64a of each cross member body 64 having the front ridgeline L1 and the rear ridgeline L2 (see FIGS. 1 and 2) is located above the middle part 52 and the lower part 53 of the vehicle body floor 2, and substantially at the same height as the lateral plate part 51a of the upper part 51.

The inner end part of each upper surface part 64a in the vehicle width directions X is disposed adjacent to and outside the floor tunnel 50 and the lateral plate part 51a of the upper part 51 in the vehicle width directions X. A flange part 64b extending upwardly is provided to an outer end part of each upper surface part 64a in the vehicle width directions X. The outer end part of each upper surface part 64a in the vehicle width directions X is joined to the respective side sill 4 via the flange part 64b. Each flange part 64b is joined, for example, by welding, to the side surface of the side sill inner part 5 of the side sills 4, which faces inwardly and toward the cabin, at a location above the joined part 54 of the vehicle body floor 2.

Each first seat bracket 65 is joined to the outer side surface of the floor tunnel 50, for example, by welding, at an inner end part thereof in the vehicle width directions X, and is joined to the upper surface part 64a of each cross member body 64, for example, by welding, at an outer end part thereof in the vehicle width directions X. Thus, the upper surface part 64a of each cross member body 64 is coupled to the floor tunnel 50 via the respective first seat bracket 65.

An inner end part of the second seat bracket 66 in the vehicle width directions X is joined to the upper surface part 64a of the cross member body 64, for example, by welding. An outer end part of each second seat bracket 66 in the vehicle width directions X is joined, for example, by welding, to the side surface of the side sill inner part 5 of the side sills 4, which faces inward and toward the cabin, at a location above the flange part 64b of each cross member body 64.

[Mount Member]

Figure 5:
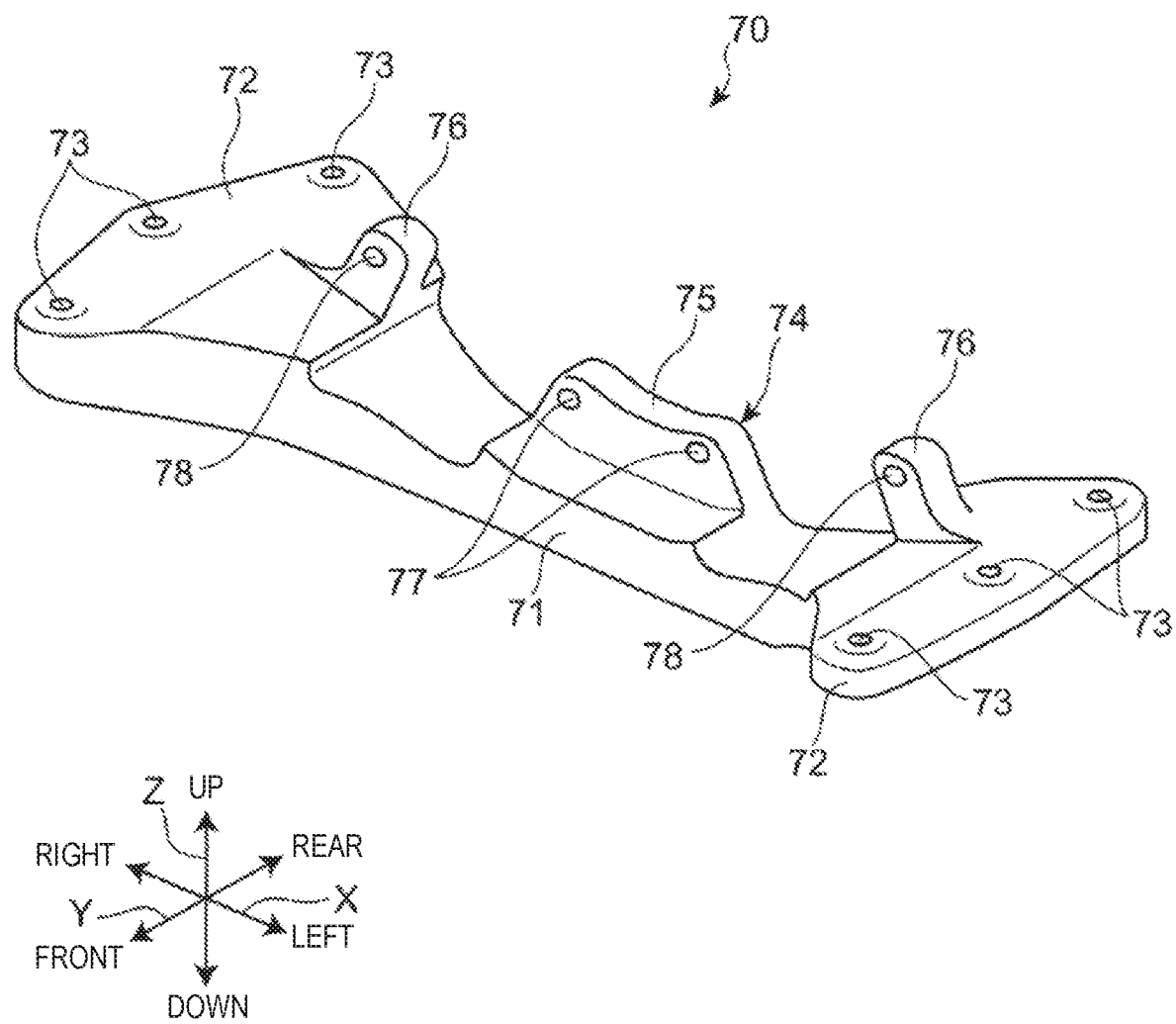
FIG. 5 is a perspective view illustrating the mount member, viewed from above of the vehicle.

The structure of the mount member 70 which supports the transmission 24 is described with reference to the perspective view of FIG. 5 and the plan view of FIG. 6.

The mount member 70 is, for example, a cast part made of aluminum alloy. The mount member 70 includes a base part 71 extending in the vehicle width directions X. The base part 71 is a flat plate-like part with a small dimension in the vehicle up-and-down directions Z compared with the dimension in the vehicle front-and-rear directions Y. The width of the base part 71 in the vehicle front-and-rear directions Y becomes gradually larger toward the outside in the vehicle width directions X. Thus, the base part 71 of the mount member 70 has an overall butterfly shape, when seen in the vehicle up-and-down directions Z. The base part 71 is curved so as to be bulged downwardly, when seen in the vehicle front-and-rear directions Y.

Both end parts of the base part 71 in the vehicle width directions X are fixed parts 72 fixed to the vehicle body floor 2. A plurality of through-holes 73 which penetrate the fixed parts 72 in the vehicle up-and-down directions Z are formed in each fixed part 72. In each fixed part 72, a plurality of through-holes 73 are disposed so as to be separated from each other in the vehicle front-and-rear directions Y. The fixed parts 72 is fixed to the vehicle body using fasteners, such as bolts inserted in the through-holes 73.

The mount member 70 is provided with a support part 74 which supports the transmission 24. The support part 74 is also provided with a central lobe 75 and a pair of left and right outside lobes 76 which project upwardly from the base part 71.

The central lobe 75 is provided at a center part of the base part 71 in the vehicle width directions X, and at a rear end part of the base part 71 in the vehicle front-and-rear directions Y. A pair of bolt holes 77 which penetrate the central lobe 75 in the vehicle front-and-rear directions Y are formed in the central lobe 75. The pair of bolt holes 77 are separated from each other in the vehicle width directions.

Each outside lobe 76 is disposed in the base part 71 at a part inwardly adjacent to the fixed part 72 in the vehicle width directions X, and is disposed substantially at the same position as the central lobe 75 in the vehicle front-and-rear directions Y. One bolt hole 78 which penetrates the outside lobe 76 in the vehicle front-and-rear directions Y is formed in each outside lobe 76.

Figure 6:
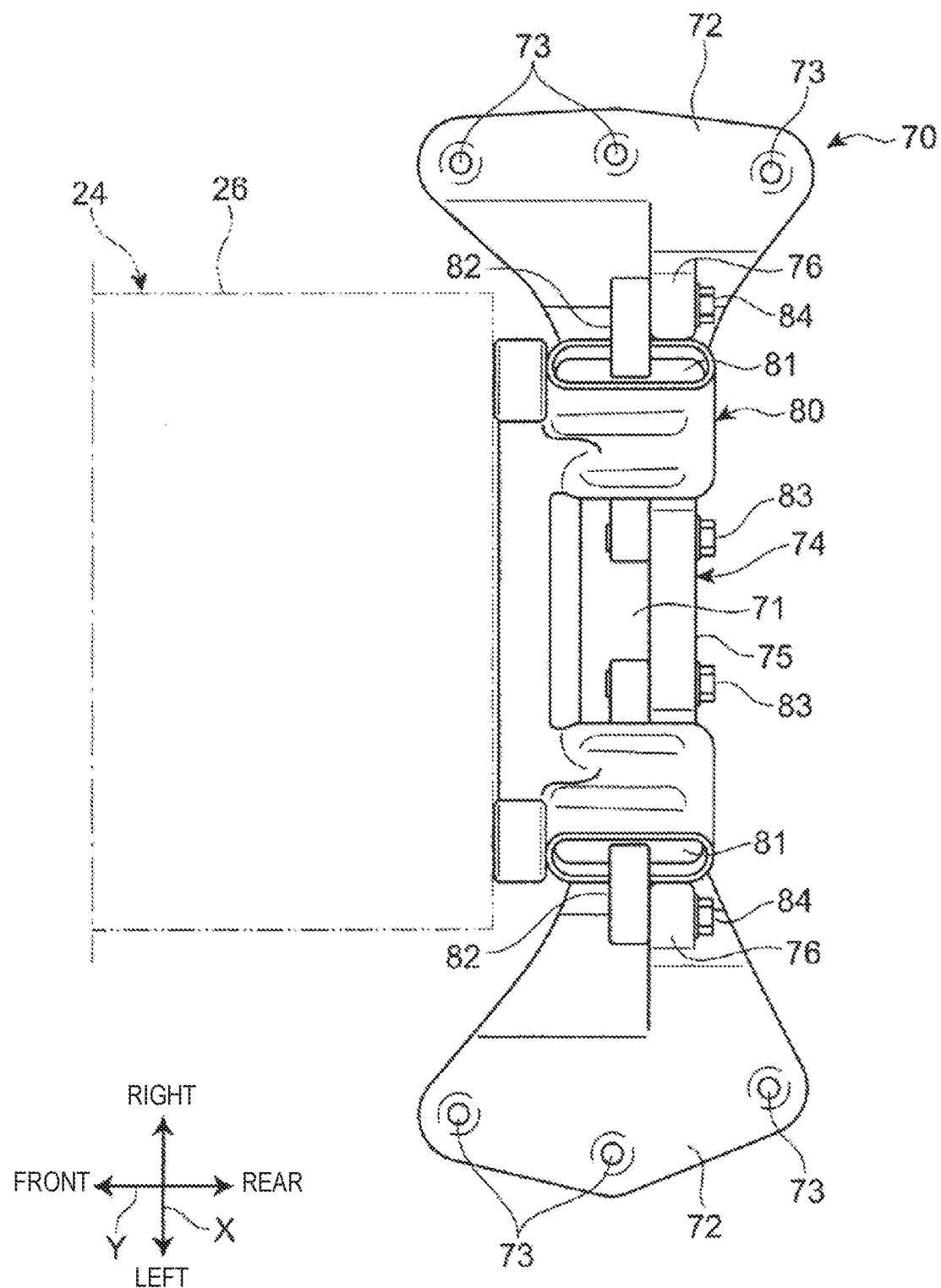
FIG. 6 is a plan view illustrating a coupling part of the mount member to a transmission, viewed from above of the vehicle.

As illustrated in FIG. 6, a supported part 26 of the transmission 24 is supported by the support part 74 of the mount member 70 via a bracket 80. The bracket 80 is fixed to the supported part 26 of the transmission 24 from the rear side of the vehicle.

A pair of coupling bars 82 are each supported by the bracket 80 via a rubber bushing 81. Each coupling bar 82 is disposed perpendicular to the vehicle front-and-rear directions Y. One end part of each coupling bar 82 is fixed to the central lobe 75 with bolts 83 inserted in the bolt holes 77 (see FIG. 5), and the other end part of the coupling bar 82 is fixed to the outside lobes 76 with bolts 84 inserted in the bolt holes 78 (see FIG. 5).

Each rubber bushing 81 intervenes between the bracket 80 fixed to the transmission 24 and the respective coupling bar 82 fixed to the mount member 70. That is, the mount member 70 supports the transmission 24 via the pair of rubber bushings 81. Thus, the transmission of vibration from the transmission 24 to the mount member 70 is reduced.

Figure 7:
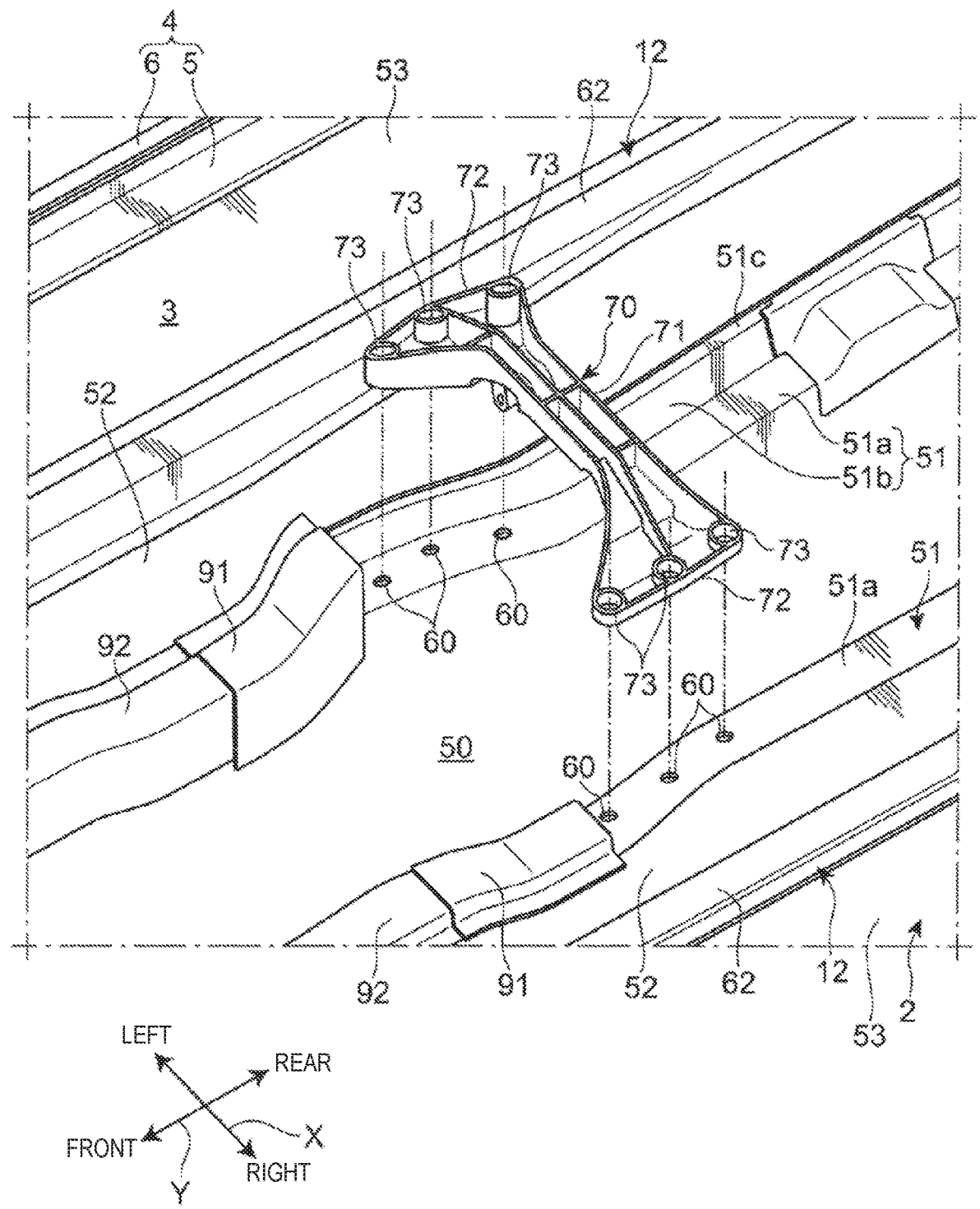
FIG. 7 is an exploded perspective view illustrating the mount member and its fixed location, viewed from below the vehicle.

As illustrated in FIG. 7, through-holes 60 corresponding to the through-holes 73 of the mount member 70 are formed in the lateral plate parts 51a of the upper parts 51 of the vehicle body floor 2. The through-holes 60 are separate from each other in the vehicle front-and-rear directions Y, in an area adjacent rearwardly to the reinforcement members 91. The reinforcement members 91 and 92 are joined to an inner surface of the floor tunnel 50 and lower surfaces of the middle parts 52 so as to cover front end parts of the upper parts 51 and their periphery from below.

The mount member 70 is fixed to lower surfaces of the lateral plate parts 51a of the upper parts 51 using the fasteners inserted in the through-holes 73 of the mount member 70 and the through-holes 60 of the upper parts 51. Each fixed part 72 of the mount member 70 is fixed to the vehicle body floor 2 at a plurality of locations (in this embodiment, three locations) in the vehicle front-and-rear directions Y. Among these fixed locations, a fixed location at the center in the vehicle front-and-rear directions Y is located so as to overlap with the upper surface part 64a of the first cross member 14 in the vehicle front-and-rear directions Y (see FIG. 2).

As illustrated in FIG. 4, the mount member 70 is fixed to the upper parts 51 of the vehicle body floor 2, and the first seat brackets 65 of the first cross members 14 disposed above the upper part 51. Particularly, as illustrated in FIG. 4, at a fixed location where it overlaps with the upper surface part 64a of the first cross members 14 in the vehicle front-and-rear directions Y, the mount member 70 and the seat rails 99 are jointly fastened to the vehicle body floor 2 and the first cross member 14.

[Fixation of Mount Member and Seat Rail]

Below, one example of the structure related to the joint fastening of the mount member 70 and the seat rails 99 to the vehicle body is described with reference to FIG. 4.

In the example illustrated in FIG. 4, the joint fastening of the mount member 70 and the seat rails 99 uses high nuts 96 which penetrate the fixed parts 72 of the mount member 70 and the lateral plate parts 51a of the upper parts 51 of the vehicle body floor 2, and bolts 94 which penetrate the first seat bracket 65 of the first cross members 14 and the seat rails 99 and threadedly engage with the high nuts 96, respectively.

Each high nut 96 is a long nut where its axial center is oriented in the vehicle up-and-down directions Z. The high nut 96 is provided with a flange part 96a which spreads radially outward at a lower end part thereof. The high nuts 96 are fitted into each of the through-holes 60 and 73 (see FIG. 7) of the lateral plate parts 51a of the mount member 70 and the vehicle body floor 2 from below. The flange part 96a of the high nuts 96 engages with a lower surface of the fixed parts 72 of the mount member 70.

Each high nut 96 projects upwardly from the lateral plate part 51a of the vehicle body floor 2, and an upper end surface of each high nut 96 contacts a lower surface of the first seat bracket 65 of the first cross members 14. Thus, the high nuts 96 function as a spacer member which intervenes between the lateral plate part 51a of the vehicle body floor 2, and the first seat bracket 65 of the first cross members 14 which is separated upwardly from the lateral plate part 51*a*.

Each bolt 94 is inserted from above so as to penetrate the respective seat rail 99 and the first seat bracket 65 of the first cross members 14 and is threadedly engaged with the respective high nut 96. By the bolts 94 being tightened to the high nuts 96, the high nuts 96 are mechanically coupled to the first cross members 14 and the vehicle body floor 2, and the seat rails 99 and the mount member 70 are jointly fastened to the first cross members 14 and the vehicle body floor 2.

According to this embodiment, since the seat rails 99 and the mount member 70 are integrated by jointly fastening them to the vehicle body, part of the weight of the seat and part of the weight of the seated person can be included in the mass m of the vehicle body vibration system in the equation of motion of Equation 1 described above. Therefore, in Equation 1, the displacement x can be effectively reduced because the mass m is increased effectively. Accordingly, the vibration transmitted to the vehicle body via the mount member 70 from the transmission 24 can be reduced effectively. As a result, the vibration transmitted to the seat via the vehicle body and the seat rails 99, i.e., the vibration sensed by the seated person, can be reduced effectively.

Moreover, since the vibration reduction is achieved by the increase of the mass m in the equation of motion of Equation 1, it is unnecessary to consider the conventional measure in which, for example, the spring constant k is increased by increasing the rigidity of the first seat brackets 65. Therefore, the weight increase of the first seat brackets 65 is prevented, thereby reducing the weight of the vehicle body.

Further, since the seat rails 99 are fixed to the highly-rigid mount member 70, the vibration being transmitted to the vehicle body from the seat can also be reduced effectively.

Moreover, since the mount member 70 and the seat rails 99 are jointly fastened through the high nuts 96 which intervene between the lateral plate part 51*a* of the vehicle body floor 2 and the first seat bracket 65 thereabove, the relative displacement between the fixed location of the mount member 70 with respect to the lower surface of the lateral plate part 51*a* and the fixed location of the seat rails 99 with respect to the upper surface of the first seat brackets 65 can be reduced effectively. Therefore, even though the mount member 70 and the seat rails 99 are separated from each other in the vehicle up-and-down directions Z, a reduction of the spring constant k of the vibration system between the members 70 and 99 is prevented in the equation of motion of Equation 1, thereby appropriately achieving the vibration reduction described above.

Further, since the high nuts 96 are disposed inside the closed cross-section between the vehicle body floor 2 and the first cross members 14, the cross-sectional deformation of the coupling parts of the high nuts 96 is reduced. Since the joint fastening is made via the high nuts 96 coupled to the vehicle body part where the cross-sectional deformation is difficult, the relative displacement between the mount member 70 and the seat rail 99 is reduced effectively.

Moreover, since the mount member 70 and the seat rails 99 are jointly fastened to the first cross members 14, the load distribution from the mount member 70 to the first cross members 14 and the load distribution from the seat rails 99 to the first cross members 14 are effectively achieved. Thus, the load applied to the fixed location of the mount member 70 and the seat rails 99 to the vehicle body is reduced. Further, it is easy to achieve the effective load transmission via the mount member 70 between the first cross members 14 on both sides of the floor tunnel 50.

As described above, although the present disclosure is described in the embodiment as one example, the present disclosure is not limited to this embodiment.

In more detail, although in the above embodiment the example in which the high nuts 96 are used as spacer members which intervene between the vehicle body floor 2 and the intermediate members thereabove (the first seat brackets 65 of the first cross members 14) is described, the spacer members may be collars without having tapped holes in the present disclosure.

Moreover, although in the above embodiment the example in which the fixed location of the mount member 70 to the vehicle body and the fixed location of the seat rails 99 to the vehicle body are separated in the vehicle up-and-down directions Z is described, the present disclosure includes a structure in which the mount member and the seat rails are fixed to the same location in the vehicle body. In this case, the spacer members may be omitted.

Further, in the above embodiment the example in which the mount member 70 and the seat rails 99 are jointly fastened to the first seat bracket 65 of the first cross member 14 is described. However, if the upper surface parts 64*a* of the cross member bodies 64 are extended to the upper part of the lateral plate parts 51*a* of the vehicle body floor 2, the joint fastening may be made to this extended part of the upper surface part 64*a*.

Moreover, although in the above embodiment the mount member 70 supports the transmission 24, the present disclosure is also applicable to any mount members which support other parts of the power transmission mechanism, such as the propeller shaft.

As described above, according to the present disclosure, in the vehicle in which the power transmission mechanism inside the floor tunnel is supported by the mount member, and the seat rails are provided on the vehicle body floor, it is possible to effectively reduce the transmission of vibration from the power transmission mechanism to the seats, while reducing the weight of the vehicle body. Therefore, this technique may also be utilized suitably in the manufacture industrial field of these kinds of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Vehicle Body Floor
3 Bottom Surface Part
4 Side Sill
14 First Cross Member (Floor Cross Member)
24 Transmission (Power Transmission Mechanism)
50 Floor Tunnel
51 Upper Part
51*a* Lateral Plate Part
64 Cross Member Body
65 First Seat Bracket
70 Mount Member
94 Bolt
96 High Nut (Spacer Member)
99 Seat Rail

What is claimed is:

1. A lower vehicle body structure, comprising:
a vehicle body floor having a bottom surface part;
a floor tunnel bulging upwardly from the bottom surface part of the vehicle body floor and extending in vehicle front-and-rear directions;
a power transmission mechanism disposed inside the floor tunnel;
a mount member supporting the power transmission mechanism from below; and
seat rails disposed on the vehicle body floor and slidably supporting seats from below,
wherein the mount member and the seat rails are jointly fastened to the vehicle body floor.

2. The lower vehicle body structure of claim 1, wherein floor cross members extending outwardly from the floor tunnel in vehicle width directions are disposed on the bottom surface part, and
wherein the mount member and each of the seat rails are jointly fastened to a respective floor cross member.

3. The lower vehicle body structure of claim 1, wherein the mount member is disposed below the vehicle body floor,
wherein each of the seat rails is disposed on a respective intermediate member that is disposed above the vehicle body floor with a gap, and
wherein the mount member and each of the seat rails are jointly fastened via a respective spacer member intervening between the vehicle body floor and the respective intermediate member.

4. The lower vehicle body structure of claim 2, wherein the mount member is disposed below the vehicle body floor,
wherein each of the seat rails is disposed on a respective intermediate member that is disposed above the vehicle body floor with a gap, and
wherein the mount member and each of the seat rails are jointly fastened via a respective spacer member intervening between the vehicle body floor and the respective intermediate member.

5. The lower vehicle body structure of claim 3, wherein each spacer member is a high nut with which a respective bolt used for jointly fastening the mount member and the respective seat rail is threadedly engaged.

6. The lower vehicle body structure of claim 4, wherein each spacer member is a high nut with which a respective bolt used for jointly fastening the mount member and the respective seat rail is threadedly engaged.

7. The lower vehicle body structure of claim 3, wherein each intermediate member is a floor cross member forming with the vehicle body floor a respective closed cross-section continuing in the vehicle width directions, and
wherein each spacer member is disposed within the respective closed cross-section.

8. The lower vehicle body structure of claim 4, wherein each intermediate member is a floor cross member forming with the vehicle body floor a respective closed cross-section continuing in the vehicle width directions, and
wherein each spacer member is disposed within the respective closed cross-section.

9. The lower vehicle body structure of claim 5, wherein each intermediate member is a floor cross member forming with the vehicle body floor a respective closed cross-section continuing in the vehicle width directions, and
wherein each spacer member is disposed within the respective closed cross-section.

10. The lower vehicle body structure of claim 6, wherein each intermediate member is a floor cross member forming with the vehicle body floor a respective closed cross-section continuing in the vehicle width directions, and
wherein each spacer member is disposed within the respective closed cross-section.

* * * * *